(12) United States Patent
Beroul

(10) Patent No.: US 7,607,892 B2
(45) Date of Patent: Oct. 27, 2009

(54) ROTORCRAFT ROTOR WITH BLADES HINGED IN FLAP AND IN LAG

(75) Inventor: Frédéric Beroul, Aix en Provence (FR)

(73) Assignee: Eurocopter, Marignane (FR)

( * ) Notice: Subject to any disclaimer, the term of this patent is extended or adjusted under 35 U.S.C. 154(b) by 470 days.

(21) Appl. No.: 11/523,614

(22) Filed: Sep. 20, 2006

(65) Prior Publication Data
US 2007/0071602 A1 Mar. 29, 2007

(30) Foreign Application Priority Data
Sep. 21, 2005 (FR) .................................. 05 09661

(51) Int. Cl.
B64C 27/50 (2006.01)
(52) U.S. Cl. ........................ 416/106; 416/107; 416/140; 416/141; 416/143
(58) Field of Classification Search ................. 416/106, 416/107, 140, 141, 143
See application file for complete search history.

(56) References Cited

U.S. PATENT DOCUMENTS

| 3,310,119 | A | * | 3/1967 | Watson ........................ 416/159 |
| 4,297,078 | A | | 10/1981 | Martin et al. |
| 4,304,525 | A | | 12/1981 | Mouille et al. |
| 4,504,193 | A | | 3/1985 | Mouille et al. |
| 4,795,310 | A | * | 1/1989 | McArdle et al. ......... 416/134 A |
| 4,915,585 | A | * | 4/1990 | Guimbal ..................... 416/140 |
| 5,372,478 | A | | 12/1994 | McCafferty et al. |
| 5,636,970 | A | * | 6/1997 | Certain ....................... 416/106 |
| 6,676,074 | B2 | * | 1/2004 | Zoppitelli et al. ......... 244/17.11 |

FOREIGN PATENT DOCUMENTS

| FR | 2677723 | 12/1992 |
| GB | 1 333 246 | 10/1970 |
| GB | 1 371 775 | 8/1971 |
| WO | 94/15113 | 7/1994 |

* cited by examiner

Primary Examiner—Igor Kershteyn
(74) Attorney, Agent, or Firm—Young & Thompson

(57) ABSTRACT

The invention relates to a rotorcraft rotor comprising a hub and at least two blades hinged relative to the hub about respective pitch axes and about respective flap axes, and about respective lag axes; each blade is secured to a respective pitch lever; the rotor includes a respective pitch control rod connected to each pitch lever by a first ball joint, and a common lag damper system centered substantially on the axis of rotation of the rotor and connected to each of the blades; the damper system is secured to a respective lateral projection from each blade via a respective second ball joint that is sufficiently close to the first ball joint connecting the pitch rod to the pitch lever for the lag damper system to be relatively insensitive to flap oscillations of the hinged blades.

14 Claims, 4 Drawing Sheets

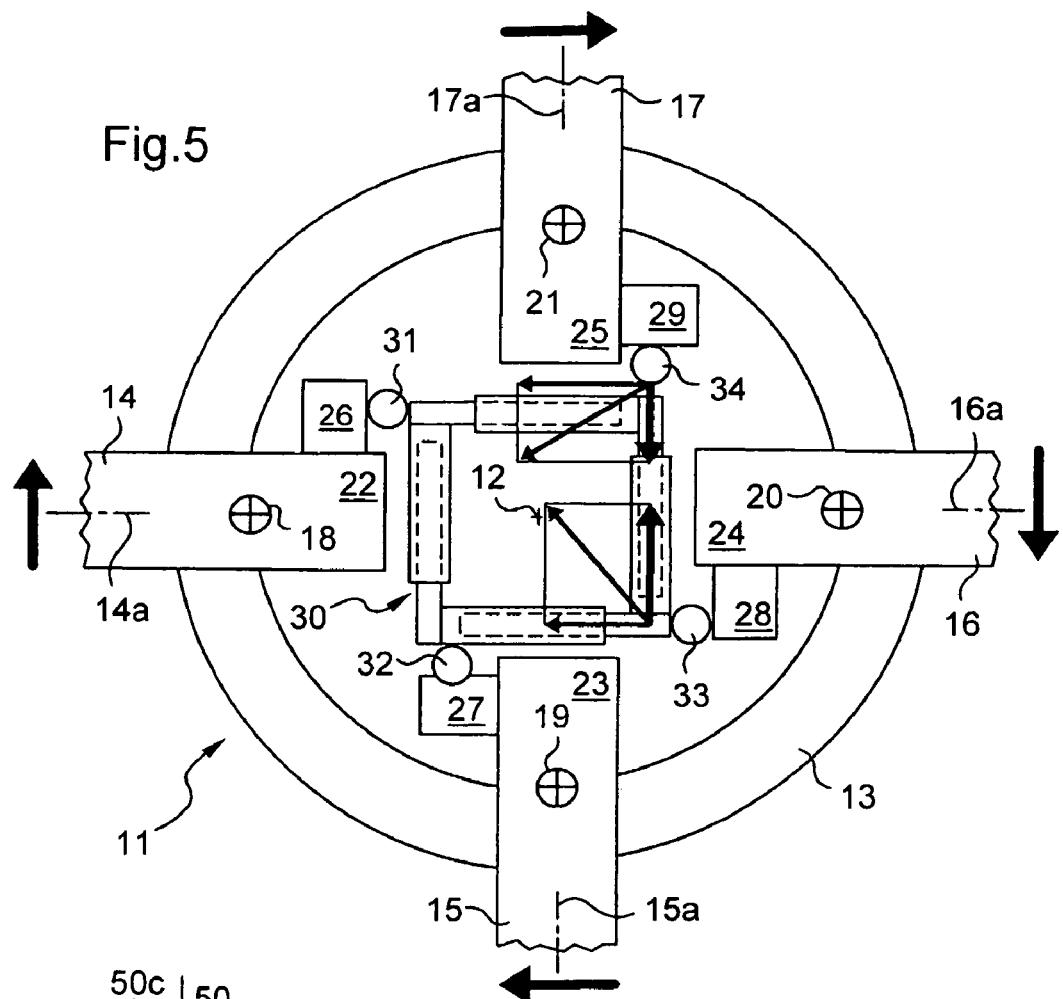
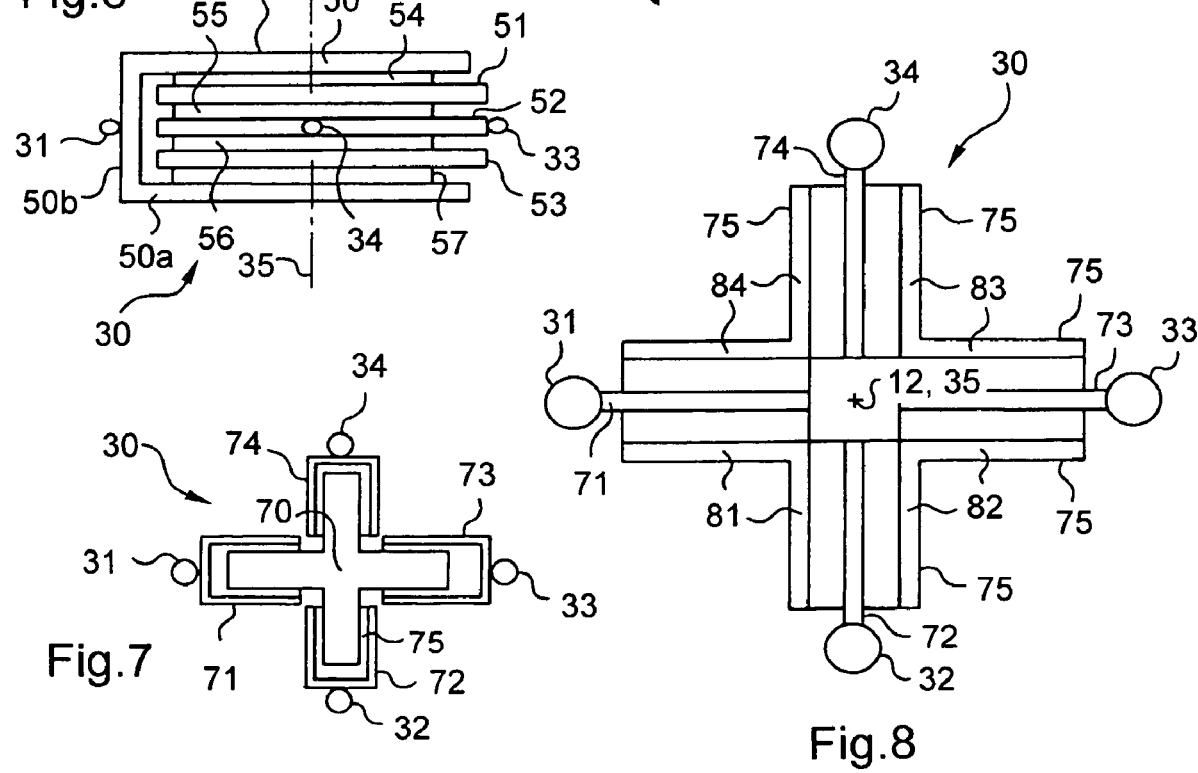

ROTORCRAFT ROTOR WITH BLADES HINGED IN FLAP AND IN LAG

FIELD OF THE INVENTION

The present invention relates to a rotorcraft rotor having blades that are hinged in flap, in lag, and in pitch.

The technical field of the invention is that of manufacturing helicopters.

The present invention relates more particularly to a rotorcraft rotor comprising at least two blades hinged in flap and in lag relative to a hub of the rotor, together with damper means provided for damping blade oscillations (relative to the hub) that take place about a "lag" hinge axis of the blade, i.e. an axis substantially parallel to the longitudinal axis of the rotor shaft.

The invention is applicable both to the main advance-and-lift rotor of a rotorcraft and also to the "anti-torque" rotor or tail rotor of a rotorcraft.

BACKGROUND OF THE INVENTION

Lag oscillations of a hinged blade of a rotorcraft rotor are generally damped little and they take place at a frequency that is low; this results in a risk of coupling with other oscillations or vibrations that occur at similar frequencies, in particular with resonant modes in deformation of the rotorcraft structure; such coupling runs the risk of damaging or destroying components of the rotorcraft; such oscillations lead to high levels of useless forces or stresses.

Consequently, the rotors of a rotorcraft are generally fitted with means or damping such oscillations, which means are generally referred to as lag dampers or as frequency adapters.

The purpose of such damper means is to reduce the amplitude of lag oscillations by dissipating a portion of the energy of such oscillations; when the damper means present non-negligible stiffness, this stiffness changes a response frequency of the assembly constituted by the hinged blade and its lag damper, which is why it can be referred to as a "frequency adapter".

The terms "damper" and "adapter" are used interchangeably below to designate a device or a system that serves to reduce or to adapt the amplitude of the lag oscillations of a hinged blade.

Such dampers generally include a structure of a polymer material that presents high capacity for elastic deformation and that is generally referred to as "elastomer" or "synthetic rubber".

Such dampers are described in particular in the following patents: FR 2 063 969, FR 2 111 845, FR 2 127 061, FR 2 672 947, FR 2 677 723, and WO 94/15113.

In general, a rotorcraft rotor has as many lag dampers as it has blades; when a lag damper connects a blade to the rotor hub, the connections between the damper and the blade and between the damper and the hub are made in respective portions of the blade and of the hub that are reinforced for this purpose; as a result, the weight, the complexity, and the cost of a rotor are increased.

When the damper interconnects two adjacent blades of the rotor, such a damper being referred to as an "inter-blade" damper, each blade needs to have two reinforced portions enabling it to be fastened respectively to two adapters.

Furthermore, under such circumstances, the lag dampers cannot damp lag oscillations of the blades that correspond to a "collective" lag mode in which the oscillations of the blades are synchronous and in-phase, since relative displacements between the blades are then zero.

Since collective lag mode is then ignored and not damped, there is an increased risk of coupling with the power unit (rotor—main gearbox—engines), so it is necessary to install lag stops on the hub in order to limit the amplitude of blade movement whenever starting or stopping the rotor.

U.S. Pat. No. 5,372,478 describes a rotor having a single damper assembly contained in a casing at the center of a hollow hub of the rotor. The assembly includes a series of elastomer layers alternating with plates; the elastomer is stressed in shear; each plate is connected via a short rod to the inner end of the corresponding blade; the casing (together with the damper assembly) is either secured rigidly to the hub, or it is pivotally mounted relative thereto, or else it is floatingly mounted, being suspended from the ends of the blades.

Such a damper system presents the drawback of being sensitive to flap oscillations of the blades.

OBJECTS AND SUMMARY OF THE INVENTION

An object of the invention is to propose lag damper means for the oscillations of hinged blades of a rotorcraft rotor that are improved and/or that remedy at least in part the drawbacks of known means for lag damping.

Thus, the invention applies to a rotorcraft rotor comprising a hub and at least two blades hinged relative to the hub about respective pitch axes, about respective flap axes, and about respective lag axes, the three axes for each blade generally coinciding at a hinge center; each blade is secured to a pitch lever; the rotor includes a respective pitch control rod connected to each pitch lever by a first ball joint, together with a lag damper system substantially centered on the axis of rotation of the rotor and connected to each of the blades; in accordance with an aspect of the invention, lag damper system is secured to a respective lateral projection of each blade via a second ball joint close to the first ball joint connecting the pitch rod to the pitch lever.

The invention applies in particular to rotors having three, four, or five hinged blades.

By means of the connection via a ball joint and because the two ball joints are close together, the lag damper system is relatively or completely insensitive to flap oscillations of the hinged blade; as a result it is subjected to low levels of interfering force, its overall size is small, and its effectiveness in reducing lag oscillations is improved.

In a preferred embodiment of the invention, the damper system is secured to the free end of the pitch lever fitted to each blade by means of said second ball joint; in particular, the ball joint providing the hinged connection between the pitch lever and the common central lag damper structure can be adjacent to (in particular beside), and on the same axis as, the ball joint providing a hinged connection between the pitch lever and the pitch control rod.

Also preferably, the ball joint providing the hinged connection between the pitch lever and the common, central lag damper structure is disposed between a spherical thrust-bearing connecting the blade to the hub and the ball joint providing the hinged connection between the pitch lever and the pitch control rod.

Preferably, the center of the ball joint providing the hinged connection between the pitch lever and the common, central lag damper structure is situated in the vicinity of the axis connecting the center of a spherical thrust-bearing hinge of the blade to the center of the ball joint between the pitch lever and the pitch control rod; in particular, the center of the second ball joint is situated on said axis.

BRIEF DESCRIPTION OF THE DRAWINGS

Other characteristics and advantages of the invention appear from the following description which refers to the accompanying drawings that show preferred embodiments of the invention without any limiting character.

FIGS. 4 and 5 are similar to FIG. 1, and they illustrate the operation of the central lag damper.

FIG. 6 is a diagrammatic side view of another embodiment of a central damper of the invention.

FIG. 7 is a diagrammatic plan view of yet another embodiment of a central damper of the invention.

FIG. 8 is a diagrammatic plan view of yet another embodiment of a central damper of the invention.

MORE DETAILED DESCRIPTION

Figure 1:
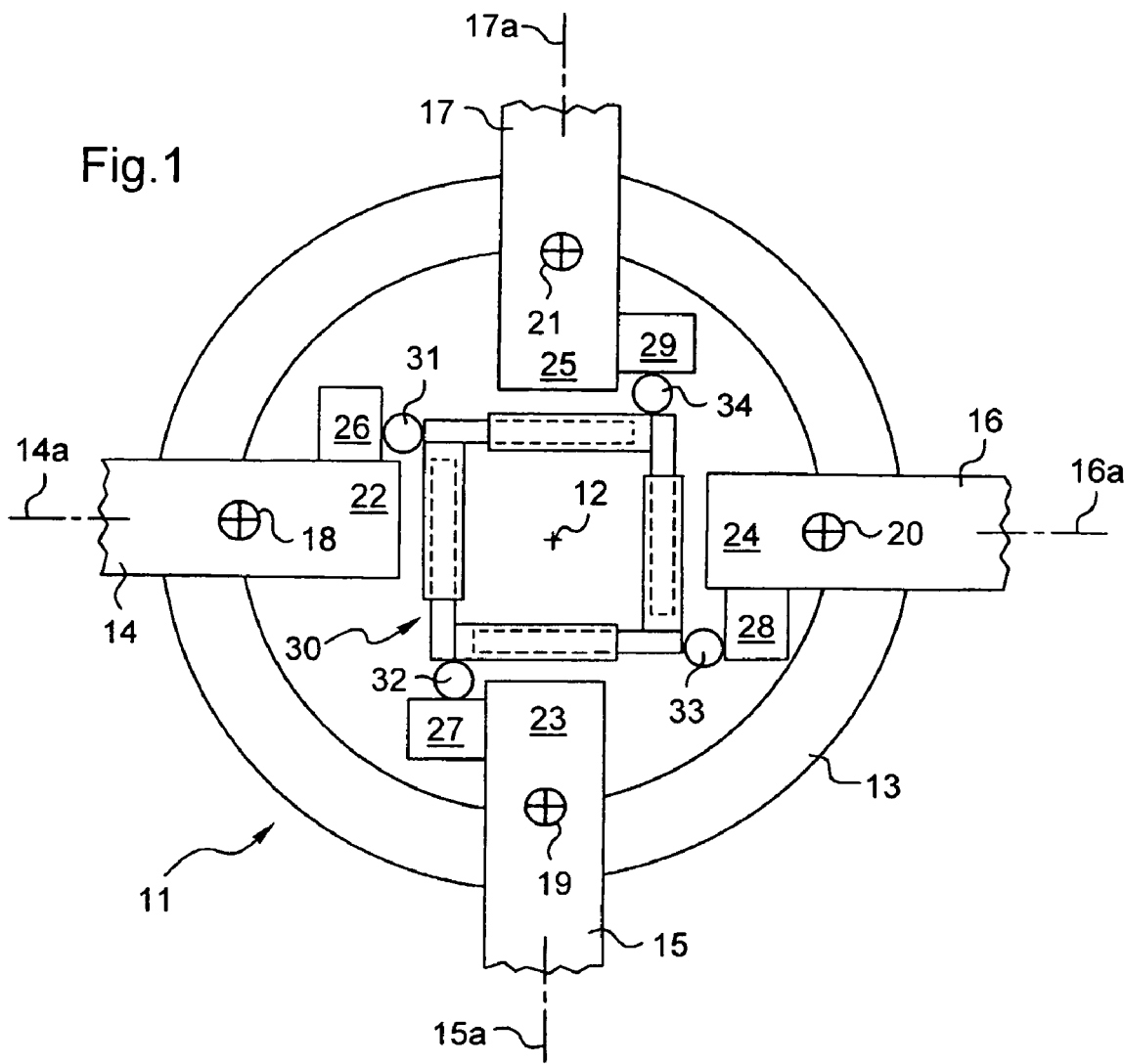
FIG. 1 is a diagrammatic plan view of a rotorcraft rotor hub fitted with a central damper device of the invention for damping lag oscillations of four blades connected to the hub via their respective roots.

On rotorcraft, the lag response of the blades is located on a frequency that is low, and in general it is damped little. As a result there is a risk of coupling with other frequencies (resonant frequencies of the structure in particular), thereby increasing the stress levels of the components of the rotor, and running the risk of damaging them or destroying them.

The amplitude of this response is conventionally controlled by means of dampers that dissipate a portion of the lag mode energy, thus damping the response of the blade, or by means of frequency adapters which, by virtue of their additional stiffness, serve to offset the frequency of the blade and adapter system as a whole, while also performing a damping function.

Although applicable both to dampers and to adapters (often referred generically as "dampers"), the present invention relates more particularly to adapters that include a damping elastomer material.

The solution described below serves to remedy the limitations of inter-blade adapters and of blade-hub adapters, and presents additional advantages:

compared with a conventional or inter-blade solution, the invention serves to reduce the number of components: for a four-blade rotor, for example, there is only one adapter instead of four; the number of ball joints is limited (to four instead of eight as in a four-blade rotor) since the adapter is connected only to the blades; this reduction in the number of parts enables reductions to be obtained in cost, in overall size, and in aerodynamic disturbances;

the number of zones on the rotor that need to be reinforced is considerably reduced compared with conventional configurations between the blades and the hub or between blades;

in addition, in some configurations, the elastomer of the adapter can be molded in a single operation so its stiffness and damping characteristics are more uniform than those of adapters made individually; this uniformity helps reduce rotor unbalance; and since the adapter is integrated at the center of the hub, it is protected and less exposed to aggression from the surroundings and to risks of accidental damage.

The device remains compatible with installing flight controls or a commutator (for measurement or deicing purposes) occupying the center of the hub, and providing the adapter presents an opening through which such equipment can pass.

The description below relates mainly to a four-blade tail rotor, however it is also applicable to other types of rotorcraft rotor, whether main rotors or tail rotors.

With reference to FIGS. 1 to 5, the invention applies in particular to a rotorcraft rotor 11 having a hub that comprises a circular ring 13 about an axis 12, constituting a general axis of symmetry for the hub.

The rotor has four blades 14 to 17 extending along respective axes 14a to 17a away from the hub; each blade is connected to the hub via a respective laminated spherical thrust-bearing 18 to 21.

Figure 9:
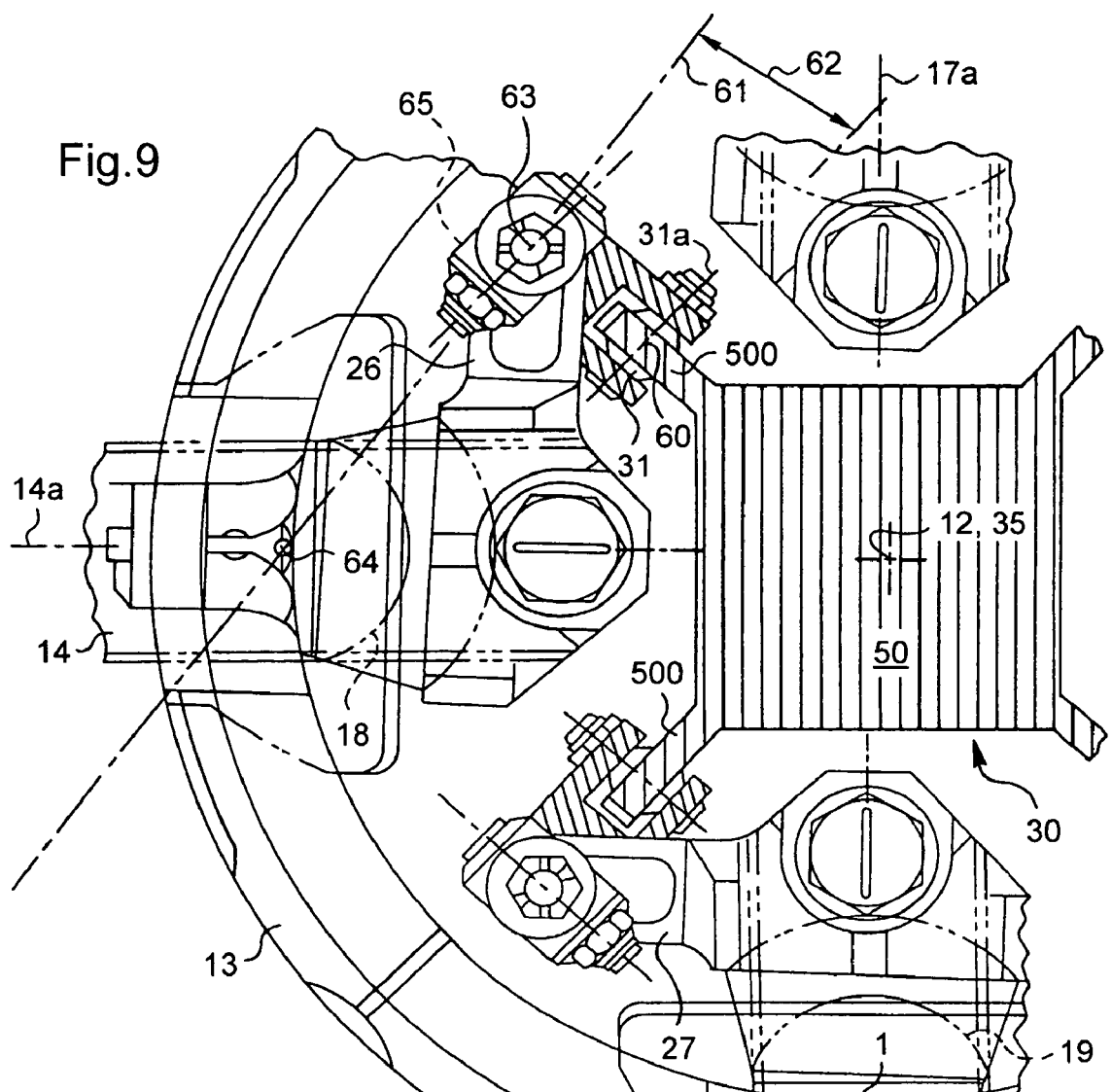
FIG. 9 is a fragmentary diagrammatic plan view showing a damper of the invention integrated in a rotorcraft rotor.
Figure 10:
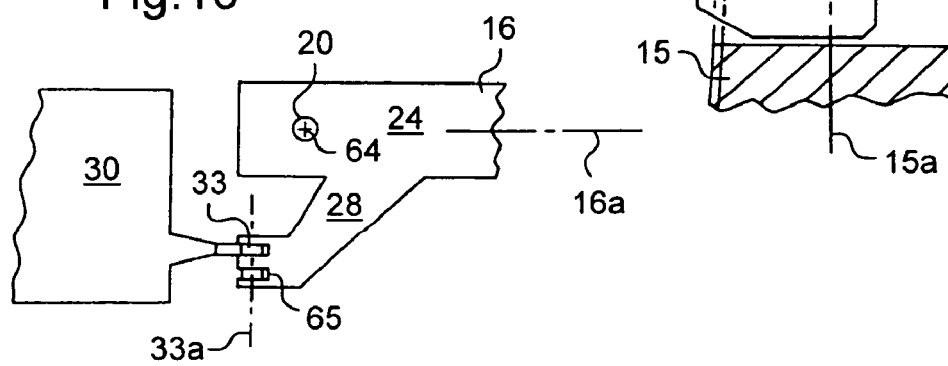
FIG. 10 is a diagrammatic plan view showing the mechanical connection between a damper and a pitch lever of a rotor blade in a preferred embodiment of the invention.

The inner end or root 22 to 25 of each blade presents a portion that projects laterally (pitch lever) having a pitch control rod secured thereto via a ball joint 65 (see FIGS. 9 and 10 in particular).

The lag damper 30 is secured to a respective lateral projection 26 to 29 from the root 22 to 25 of each of the blades via a respective ball joint 31 to 34.

In the embodiment shown in FIGS. 1 to 5, the surface of the damper when seen from above is that of a square frame; each "side" of the frame forms a respective damper unit; in this embodiment, the damper 30 is made up by connecting these four identical damper units 30a to 30d together in pairs.

Figure 2:
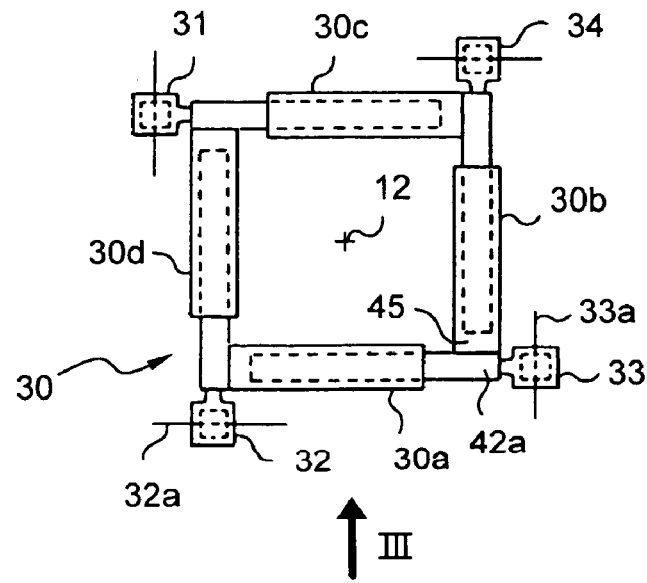
FIG. 2 is a diagrammatic plan view of the damper device fitted to the rotor of FIG. 1.
Figure 3:
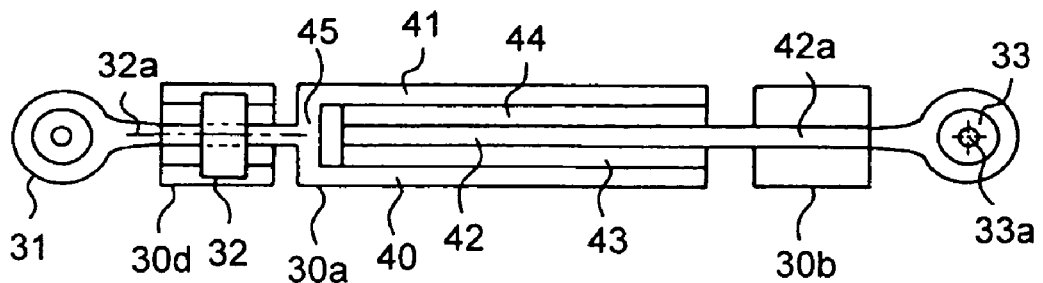
FIG. 3 is a side view seen looking along III and showing the device of FIG. 2.

With reference to FIG. 3 in particular, the damper unit 30a comprises two outer strips 40, 41 having an inner strip 42 extending between them; the strips 40 to 42 are in the form of plane plates having the shape of elongate rectangles and they extend parallel to one another. These strips extend perpendicularly to the axis of symmetry 35 (FIG. 2) of the damper, which axis substantially coincides with the axis 12 (FIG. 1) of the hub when the damper is in the mounted position.

A first elastomer layer 43 connects the top face of the strip 40 to the bottom face of the strip 42, and a second elastomer layer 44 connects the top face of the strip 42 to the bottom face of the strip 41.

The (projecting) outer end 42a of the inner strip 42 of the unit 30a is rigidly secured to the end 45 of the adjacent unit 30b.

The strips 40 and 41 of each damper unit are rigidly interconnected at their common second end 45.

The end 42a of the strip 42 is also rigidly secured to a ball joint 33 connecting it to the root of the corresponding blade (referenced 16 in FIG. 1); this connection can be made by engaging the ball joint 33 on a shaft extending along an axis 33a (FIGS. 2 and 10), said shaft being secured to a pitch lever 28 projecting from the root 24 of the blade 16; the connections between the damper 30 and the blades 14, 15, and 17 are obtained respectively via ball joints 31, 32, and 34 that are rigidly secured to the ends of the inner strips (such as 42) of the damper units 30c, 30d, and 30b of the structure 30.

In the various embodiments, the respective hinge centers of the ball joints connecting the damper to the blades are substantially coplanar.

The single central adapter and its connections to the blades present the following characteristics:

each blade is connected to a strip of the adapter via a single ball joint;

each of these strips is connected to two adjacent strips via a preferably visco-elastic material or via a device that provides the desired stiffness and damping; this connection may be direct as shown in FIGS. 1 to 3 in particular, or indirect as shown in FIGS. 6 to 8, where at least one strip connected to a blade is itself connected to the adjacent strip via a single common strip;

the attachment points of the strips are chosen so as to minimize the movements associated with the pitch and flap movements of the blade; the ball joints are preferably positioned on the pitch levers so as to be subjected practically only to the lag movements of the blades (both cyclic and collective); and the positioning of the adapter and the ball joints connecting it to the blades is such that the adapter is stressed not only by the cyclic lag movements of the blades, but also by the collective lag mode. For this purpose, at least some of the forces applied to two adjacent strips lie preferably on a common line of action and act in opposite directions.

The shape of the strips in the damper devices shown in FIGS. 1 to 6 is designed so that the shear of the elastomer takes place in a horizontal plane (perpendicularly to the axis 12); for the dampers shown in FIGS. 7 and 8 in particular, the elastomer shear may take place in a plane that is vertical or horizontal, or indeed it may take place cylindrically (as in cylindrical inter-blade adapters).

Figure 4:
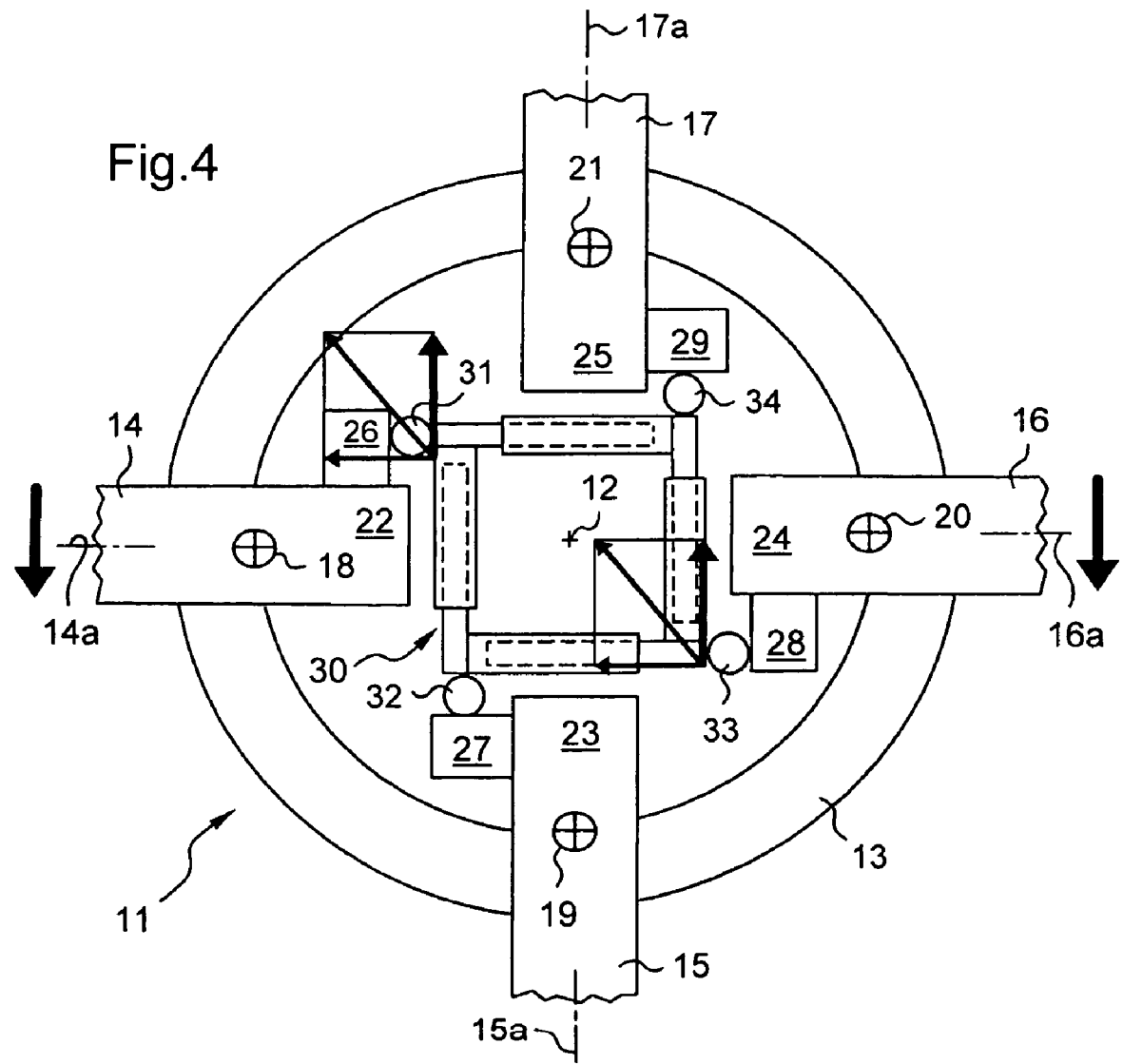

The cyclic lag operation of the damper shown in FIGS. 1 to 5 is shown diagrammatically in FIG. 4, while its collective lag operation is shown diagrammatically in FIG. 5.

With reference to FIG. 4, when stressed in this mode, two opposite blades (14 and 16 in the drawings) move in the same direction (represented by bold arrows) while the other two blades (15 and 17) remain substantially stationary.

The elastomer is then subjected to shear between the stationary strips and the moving strips: the movement of the blade 16 tends to shorten the units 30a and 30b, while the movement of the blade 14 tends to length the units 30c and 30d.

FIG. 5 shows how the adapter is stressed by a fraction of the forces induced by the collective lag movement of the blades (i.e. when all of the blades move in the same direction).

By way of example, the lag displacement of the blade 17, for example, produces turning of the projection 29 about the spherical thrust-bearing 21 and stresses the adapter via the ball joint 34. This stress can be resolved into two respective (longitudinal) compression forces on the units 30c and 30b.

By applying the same observation to the blade 16, it can be seen that the unit 30b is stressed by two longitudinal forces in opposite directions. The same reasoning applies to the other blades 14 and 15 and to the other damper units 30a, 30c, and 30d. Such a damper structure thus serves also to handle collective lag mode.

In the embodiment corresponding to FIGS. 6 and 9, the damper 30 comprises four plane strips 50 to 53 of generally square shape that are superposed along an axis 35 and that are interconnected in pairs by respective elastomer layers 54 to 56; a lateral projection (such as 500 in FIG. 9) on each strip receives a ball joint (such as 31) for connection to the corresponding blade.

The outer strip 50 comprises two rigid plates 50a and 50c which are rigidly secured to each other via a rigid connection 50b secured to the projection 500 carrying the ball joint 31; the plates 50a and 50c are connected to the adjacent strips 54, 53 by two respective elastomer layers 54 and 57.

This embodiment is preferably pierced by a central opening on the axis 12, 35.

With reference to FIG. 9, the hinge center 60 of the ball joint 31 providing the connection between the blade 14 and the damper 30 is situated at a distance 62 from the axis 61 passing through the hinge center 63 of a ball joint 65 connecting a pitch control rod to the pitch lever 26 and passing via the hinge center 64 between the blade 14 and the hub 13 (via the spherical thrust-bearing).

This distance 62 is preferably shorter than the distance between said hinge centers 63 and 64, the ideal being to eliminate this distance 62 so as to filter all of the flap movements that disturb the operation of the adapter.

The axis 61 is the pivot axis of the blade when it is subjected to forces tending to make it flap, the centers of rotation 63 and 64 being stationary in the absence of any pitch variation control.

In the embodiment shown in FIG. 7, the damper 30 presents a single central inner strip 70 in the form of a four-armed cross associated with four outer strips 71 to 74 fitted with respective ball joints 31 to 34 for connection to respective blades of the rotor; an elastomer layer (such as 75) connects each of the strips 71 to 74 to a respective one of the arms of the common strip 70 which is preferably mounted to "float" relative to the hub (i.e. it is not secured thereto).

This embodiment can be pierced by a central opening on the axis 12, 35.

In the variant shown in FIG. 8, the floating strips 81 to 84 are outer strips relative to the inner strips 71 to 74 and to the elastomer layers 75; only a portion of each inner strip carrying a respective connecting ball joint 31 to 34 projects beyond the strips 81 to 84.

In a particular embodiment, the strips 81 to 84 are rigidly interconnected so as to constitute a single member.

This embodiment can be pierced by a central opening on the axis 12, 35.

In the embodiment shown in FIG. 10, the ball joint 33 connecting the damper 30 to the blade 16, and the ball joint 65 connecting a pitch control rod to said blade are mounted adjacent to the end of the pitch lever 28 of the blade 16 on a common axis 33a, and are disposed substantially side by side.

Preferably, the axis 33a coincides with the axis 61 shown in FIG. 9.

What is claimed is:

1. A rotorcraft rotor comprising a hub and at least two blades hinged relative to the hub about respective pitch axes, about respective flap axes, and about respective lag axes, the three axes coinciding at a hinge center for each blade, each blade being secured to a respective pitch lever, the rotor including for each blade a pitch control rod connected to the pitch lever via a first ball joint, and a common lag damper structure centered substantially on the axis of rotation of the rotor and connected to each of the blades, wherein the lag damper structure is secured to a respective lateral projection of each blade via a respective single second ball joint that is sufficiently close to the first ball joint connecting the pitch rod to the pitch lever to ensure that the lag damper system is relatively or completely insensitive to flap oscillations of the hinged blades, and wherein the common damper structure is not secured to the hub, in which the damper structure comprises a plurality of identical damper units together with a strip common to a plurality of damper units and not secured to the hub, and in which the damper structure is secured to the pitch level of each blade.

2. A rotor according to claim 1, in which the damper structure is secured via said second ball joint to the free end of the pitch lever fitted to each blade.

3. A rotor according to claim 1, in which the second ball joint is beside the first ball joint.

4. A rotor according to claim 1, in which the second ball joint lies on the same axis as the first ball joint.

5. A rotor according to claim 1, in which the second connection ball joint is disposed between a spherical thrust-bearing connecting the blade to the hub and the first ball joint.

6. A rotor according to claim 1, in which the center of the second ball joint is situated close to the axis joining the center of a spherical thrust-bearing hinging the blade to the center of the first connection ball joint.

7. A rotor according to claim 1, in which the respective hinge centers of the second ball joints connecting the damper to the blades are coplanar.

8. A rotor according to claim 1, in which each blade is connected to a strip of the damper structure by means of a single ball joint rigidly secured to said strip.

9. A rotor according to claim 1, in which the positioning of the damper structure and of the ball joints connecting it to the blades is such that the damper structure is stressed by the collective lag mode.

10. A rotor according to claim 1, in which the damper structure comprises plane strips superposed along an axis, the strips being generally square in shape, and being connected together in pairs by respective elastomer layers, a lateral projection on each strip receiving a ball joint connecting to the corresponding blade.

11. A rotor according to claim 1, in which the damper structure presents a single central inner strip comprising a plurality of arms, together with outer strips each fitted with a respective ball joint connecting to a respective one of the rotor blades, each of the outer strips being connected via a respective elastomer layer to a respective one of the arms of the common strip which is not secured to the hub.

12. A rotor according to claim 1, in which the damper structure presents a floating common strip external to the inner strips and to the elastomer layers, with only a portion of each inner strip carrying a respective connection ball joint projecting outside the floating common strip.

13. A rotorcraft rotor comprising a hub and at least two blades hinged relative to the hub about respective pitch axes, about respective flap axes, and about respective lag axes, the three axes coinciding at a hinge center for each blade, each blade being secured to a respective pitch lever, the rotor including for each blade a pitch control rod connected to the pitch lever via a first ball joint, and a common lag damper structure centered substantially on the axis of rotation of the rotor and connected to each of the blades, wherein the lag damper structure is secured to a respective lateral projection of each blade via a respective single second ball joint that is sufficiently close to the first ball joint connecting the pitch rod to the pitch lever to ensure that the lag damper system is relatively or completely insensitive to flap oscillations of the hinged blades, and wherein the common damper structure is not secured to the hub, in which the damper structure comprises strips each of which is connected directly or indirectly to two adjacent strips via respective layers of viscoelastic material that is stressed in shear.

14. A rotorcraft rotor comprising a hub and at least two blades hinged relative to the hub about respective pitch axes, about respective flap axes, and about respective lag axes, the three axes coinciding at a hinge center for each blade, each blade being secured to a respective pitch lever, the rotor including for each blade a pitch control rod connected to the pitch lever via a first ball joint, and a common lag damper structure centered substantially on the axis of rotation of the rotor and connected to each of the blades, wherein the lag damper structure is secured to a respective lateral projection of each blade via a respective single second ball joint that is sufficiently close to the first ball joint connecting the pitch rod to the pitch lever to ensure that the lag damper system is relatively or completely insensitive to flap oscillations of the hinged blades, and wherein the common damper structure is not secured to the hub, in which the damper structure is formed by connecting together in pairs a plurality of identical damper units to form a frame, each damper unit comprising two outer strips having an inner strip extending therebetween, the strips being in the form of plane plates having the shape of elongate rectangles and extending parallel to one another, a first layer of elastomer connecting the top face of a first outer strip to the bottom face of the inner strip, and a second layer of elastomer connecting the top face of the inner strip to the bottom face of the other outer strip, the projecting outer end of the inner strip of each unit being rigidly secured to the end of the adjacent damper unit, and being rigidly secured to a ball joint connecting with the root of the corresponding blade.

* * * * *

UNITED STATES PATENT AND TRADEMARK OFFICE
CERTIFICATE OF CORRECTION

PATENT NO. : 7,607,892 B2
APPLICATION NO. : 11/523614
DATED : October 27, 2009
INVENTOR(S) : Frédéric Beroul It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Twelfth Day of October, 2010

David J. Kappos
*Director of the United States Patent and Trademark Office*